United States Patent
Beale et al.

(10) Patent No.: US 12,003,331 B2
(45) Date of Patent: Jun. 4, 2024

(54) WIRELESS DATA TRANSMISSION APPARATUS, WIRELESS DATA RECEPTION APPARATUS AND METHODS

(71) Applicant: Sony Corporation, Tokyo (JP)

(72) Inventors: Martin Warwick Beale, Basingstoke (GB); Shin Horng Wong, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 532 days.

(21) Appl. No.: 17/281,254

(22) PCT Filed: Oct. 29, 2019

(86) PCT No.: PCT/EP2019/079520
§ 371 (c)(1),
(2) Date: Mar. 30, 2021

(87) PCT Pub. No.: WO2020/089221
PCT Pub. Date: May 7, 2020

(65) Prior Publication Data
US 2022/0006573 A1    Jan. 6, 2022

(30) Foreign Application Priority Data

Nov. 1, 2018  (EP) .................................. 18204003

(51) Int. Cl.
*H04L 1/1812*    (2023.01)
*H04L 1/1829*    (2023.01)
(Continued)

(52) U.S. Cl.
CPC .......... *H04L 1/1819* (2013.01); *H04L 1/1861* (2013.01); *H04L 1/1893* (2013.01); *H04W 28/04* (2013.01); *H04W 72/20* (2023.01)

(58) Field of Classification Search
CPC ... H04L 1/1819; H04L 1/1861; H04L 1/1893; H04W 72/20; H04W 28/04
See application file for complete search history.

(56) References Cited

U.S. PATENT DOCUMENTS

2009/0249155 A1 * 10/2009 Mayrench ............. H04L 1/0053
                                                                    714/748
2014/0133382 A1    5/2014 Shin et al.
(Continued)

FOREIGN PATENT DOCUMENTS

WO    2018/103659 A1    6/2018

OTHER PUBLICATIONS

3GPP, "Study on Scenarios and Requirements for Next Generation Access Technologies; (Release 15)", TR 38.913 V15.0.0, Jun. 2018, pp. 1-39.
(Continued)

*Primary Examiner* — Duc C Ho
(74) *Attorney, Agent, or Firm* — XSENSUS LLP

(57) ABSTRACT

A method for a receiver, the method comprising receiving a first plurality of blocks transmitted by a transmitter using first communications resources, determining that at least one of the first plurality of blocks was not received correctly, in response to determining that at least one of the first plurality of blocks was not received correctly, transmitting to the transmitter a first negative acknowledgement (NACK) indication that at least one of the first plurality of blocks was not received correctly, the NACK indication not indicating which of the first plurality blocks was not received correctly, receiving a subset of the first plurality of blocks retransmitted by the transmitter in response to the NACK indication using second communications resources, and after receiving (Continued)

the subset of the first plurality of blocks, determining whether all of the first plurality of blocks have been received correctly.

18 Claims, 9 Drawing Sheets

(51) Int. Cl.
  *H04L 1/1867* (2023.01)
  *H04W 28/04* (2009.01)
  *H04W 72/20* (2023.01)

(56) References Cited

U.S. PATENT DOCUMENTS

| | | | | |
|---|---|---|---|---|
| 2016/0381673 | A1* | 12/2016 | Sun | G06F 3/065 370/329 |
| 2018/0270022 | A1 | 9/2018 | Sun et al. | |
| 2018/0278399 | A1* | 9/2018 | Sundararajan | H04L 1/0041 |

OTHER PUBLICATIONS

3GPP, NR; NR and NG-RAN Overall Description; Stage 2 (Release 15), TS 38.300 V15.2.0, Jun. 2018, pp. 1-87.
Holma et al., "LTE for UMTS OFDMA and SC-FDMA Based Radio Access", John Wiley and Sons, 2009, pp. 25-27.
Ericsson et al., "New WID on Even further enhanced MTC for LTE", 3GPP TSG RAN Meeting #75, RP-170732, Mar. 6-9, 2017, 4 pages.
Huawei et al., "New WID on Further NB-IoT Enhancements", 3GPP TSG RAN Meeting #75, RP-170852, Mar. 6-9, 2017, 6 pages.
Ericsson, "New WID on Rel-16 MTC Enhancements for LTE", 3GPP TSG RAN Meeting #80, RP-181450, Jun. 11-14, 2018, 4 pages.
Ericsson et al., "New WID on Rel-16 Enhancements for NB-IoT", 3GPP TSG RAN Meeting #80, Jun. 11-14, 2018, RP-181451, 4 pages.

* cited by examiner

WIRELESS DATA TRANSMISSION APPARATUS, WIRELESS DATA RECEPTION APPARATUS AND METHODS

CROSS-REFERENCE TO RELATED APPLICATIONS

The present application is based on PCT filing PCT/EP2019/079520, filed Oct. 29, 2019, which claims priority to EP 18204003.0, filed Nov. 1, 2018, the entire contents of each are incorporated herein by reference.

BACKGROUND

Field

The present disclosure relates to devices and methods for the wireless transmission and reception of data.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Another example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Embodiments of the present technique can provide a method for a receiver, the method comprising receiving a first plurality of blocks transmitted by a transmitter using first communications resources, determining that at least one of the first plurality of blocks was not received correctly, in response to determining that at least one of the first plurality of blocks was not received correctly, transmitting to the transmitter a first negative acknowledgement (NACK) indication that at least one of the first plurality of blocks was not received correctly, the NACK indication not indicating which of the first plurality of blocks was not received correctly, receiving a subset of the first plurality of blocks retransmitted by the transmitter in response to the NACK indication using second communications resources, and after receiving the subset of the first plurality of blocks, determining whether all of the first plurality of blocks have been received correctly.

Embodiments of the present technique, which further relate to apparatus for wireless data transmission, apparatus for wireless data reception and methods for operating the same, allow for efficient transmission of acknowledgement information and subsequent retransmission of data determined not to have been received correctly.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Figure 1:
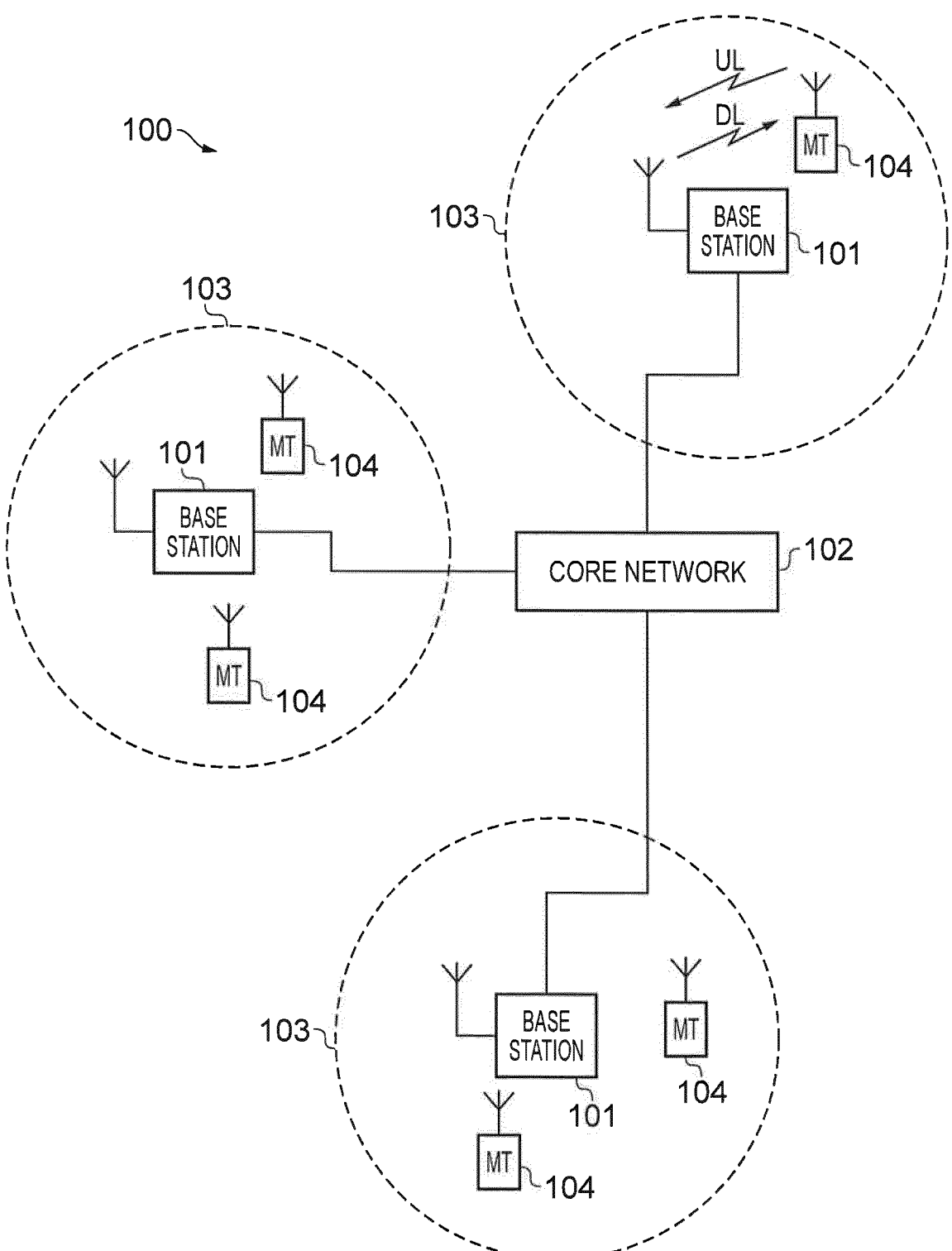
FIG. 1 schematically represents some aspects of a LTE-type wireless telecommunication system which may be configured to operate in accordance with example embodiments of the present disclosure.

Long Term Evolution Advanced Radio Access Technology (4G) FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104, and within which a communications device may obtain service. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, example embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
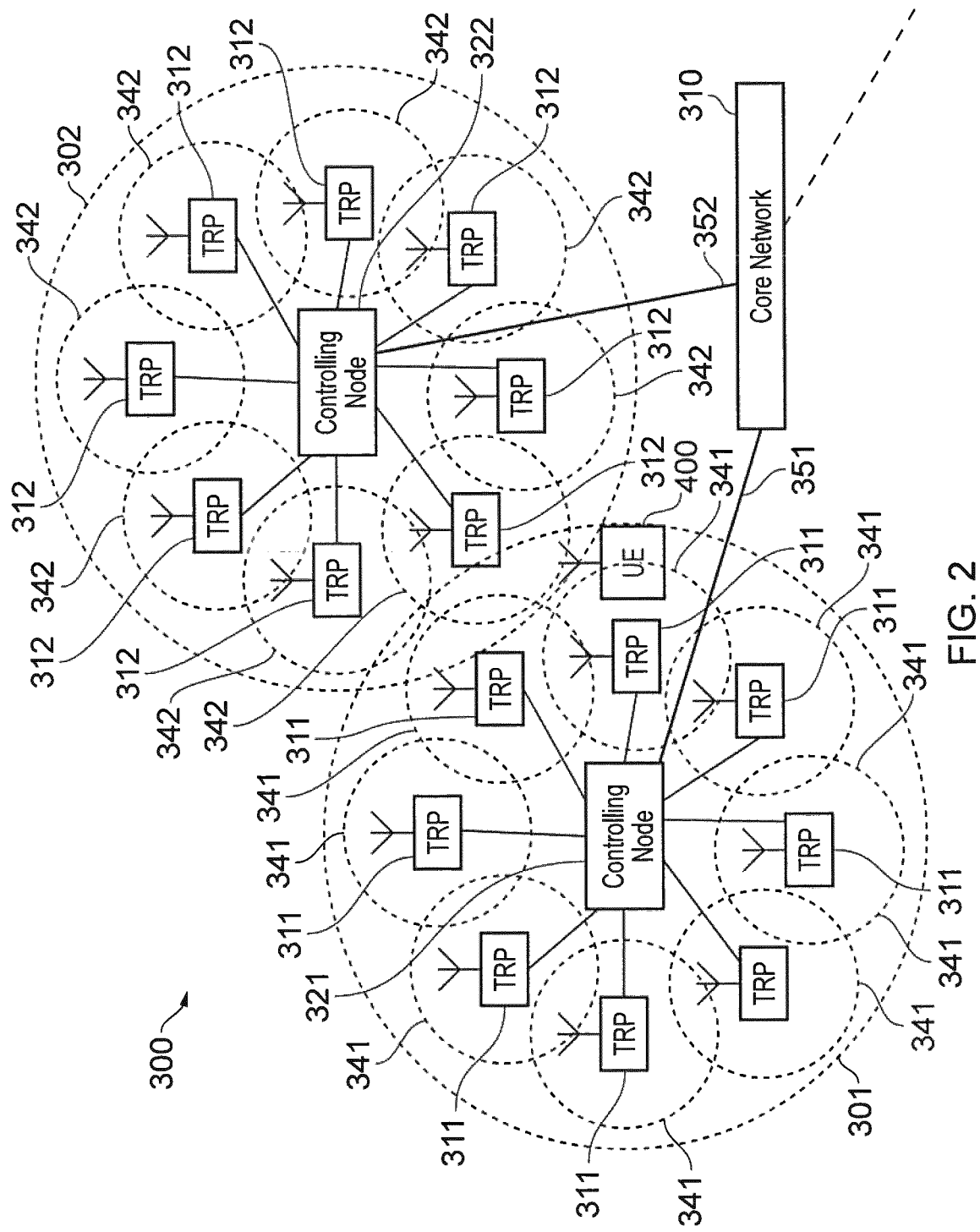
FIG. 2 schematically represents some example aspects of a new radio access technology (RAT) wireless communications network which may be configured to operate in accordance with embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for communications devices connected to the network. Each distributed unit 311, 312 has a coverage area (radio access footprint) 341, 342 which together define the coverage of the respective communication cells 301, 302. Each distributed unit 311, 312 includes transceiver circuitry for transmission and reception of wireless signals and processor circuitry configured to control the respective distributed units 311, 312.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device 400 is represented in FIG. 2 within the coverage area of the first communication cell 301. This communications device 400 may thus exchange signalling with the first controlling node 321 in the first communication cell via one of the distributed units 311 associated with the first communication cell 301. In some cases communications for a given communications device are routed through only one of the distributed units, but it will be appreciated in some other implementations communications associated with a given communications device may be routed through more than one distributed unit, for example in a data duplication scenario and other scenarios.

The particular distributed unit(s) through which a communications device is currently connected through to the associated controlling node may be referred to as active distributed units for the communications device. Thus the active subset of distributed units for a communications device may comprise one or more than one distributed unit (TRP). The controlling node 321 is responsible for determining which of the distributed units 311 spanning the first communication cell 301 is responsible for radio communications with the communications device 400 at any given time (i.e. which of the distributed units are currently active distributed units for the communications device). Typically this will be based on measurements of radio channel conditions between the communications device 400 and respective ones of the distributed units 311. In this regard, it will be appreciated that the subset of the distributed units in a cell which are currently active for a communications device will depend, at least in part, on the location of the communications device within the cell (since this contributes significantly to the radio channel conditions that exist between the communications device and respective ones of the distributed units).

In at least some implementations the involvement of the distributed units in routing communications from the communications device to a controlling node (controlling unit) is transparent to the communications device 400. That is to say, in some cases the communications device may not be aware of which distributed unit is responsible for routing communications between the communications device 400 and the controlling node 321 of the communication cell 301 in which the communications device is currently operating, or even if any distributed units 311 are connected to the controlling node 321 and involved in the routing of communications at all. In such cases, as far as the communications device is concerned, it simply transmits uplink data to the controlling node 321 and receives downlink data from the controlling node 321 and the communications device has no awareness of the involvement of the distributed units 311, though may be aware of radio configurations transmitted by distributed units 311. However, in other embodiments, a communications device may be aware of which distributed unit(s) are involved in its communications. Switching and scheduling of the one or more distributed units may be done at the network controlling node based on measurements by the distributed units of the communications device uplink signal or measurements taken by the communications device and reported to the controlling node via one or more distributed units.

In the example of FIG. 2, two communication cells 301, 302 and one communications device 400 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

The embodiments of the present invention can find application with advanced wireless communications systems such as those referred to as 5G or New Radio (NR) Access Technology. Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) [1] services are for a reliability of $1\text{-}10^{-5}$ (99.999%) for one transmission of a 32 byte packet with a user plane latency of 1 ms [3]. Massive Machine Type Communications (mMTC) is another example of a service which may be supported by NR-based communications networks.

The elements of the wireless access network shown in FIG. 1 may be equally applied to a 5G new RAT configuration, except that a change in terminology may be applied as mentioned above.

Figure 3:
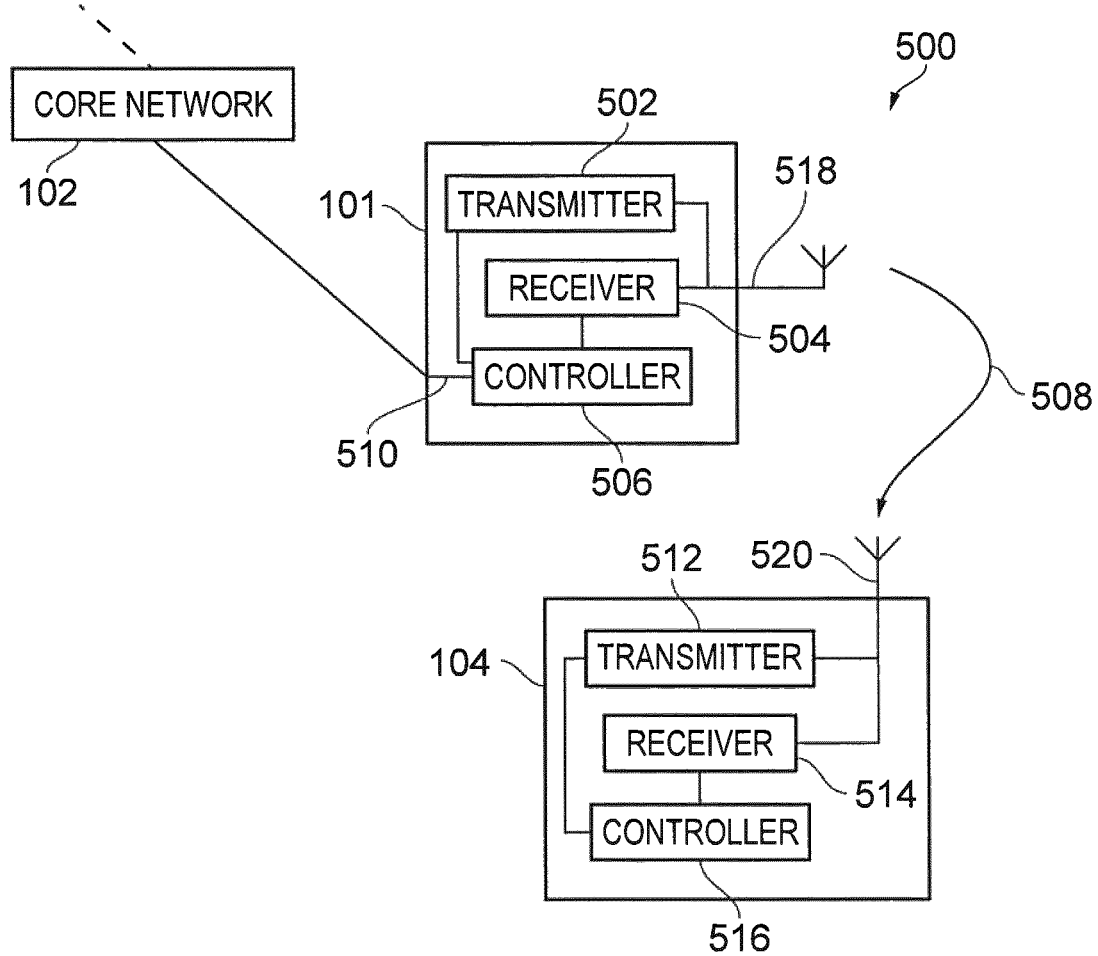
FIG. 3 schematically shows a telecommunications system according to an embodiment of the present disclosure.

FIG. 3 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part 102 coupled to a radio network part. The radio network part comprises the infrastructure equipment (which may be an evolved-nodeB) 101 coupled, via a wireless access interface illustrated generally by arrow 508, to a communications device 104, which may also be referred to as a terminal device. It will of course be appreciated that in practice the radio network part may comprise a plurality of base stations serving a larger number of communications devices across various communication cells. However, only a single infrastructure equipment and single communications device are shown in FIG. 3 in the interests of simplicity.

As noted above, the operation of the various elements of the communications system 500 shown in FIG. 3 may be broadly conventional apart from where modified to provide functionality in accordance with embodiments of the present disclosure as discussed herein.

The infrastructure equipment 101 is connected to the core network 102 via an interface 510 to a controller 506. The infrastructure equipment 101 includes a receiver 504 connected to an antenna 518 and a transmitter 502 connected to the antenna 518. The receiver 504 and the transmitter 502 are both connected to the controller 506. The controller 506 is configured to control the infrastructure equipment 101 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 506 may comprise circuitry which is suitably configured/programmed to provide the desired functionality using conventional programming/configuration techniques for equipment in wireless telecommunications systems. The transmitter 502, receiver 504 and controller 506 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 101 will in general comprise various other elements associated with its operating functionality.

Correspondingly, the communications device 104 includes a controller 516 connected to a receiver 514 which receives signals from an antenna 520. The controller 516 is also connected to a transmitter 512 which is also connected to the antenna 520. The controller 516 is configured to control the communications device 104 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 516 may comprise circuitry which is suitably configured/programmed to provide the desired functionality using conventional programming/configuration techniques for equipment in wireless telecommunications systems. The transmitter 512, receiver 514 and controller 516 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 104 will in general comprise various other elements associated with its operating functionality, for example a power source, user interface, and so forth, but these are not shown in FIG. 3 in the interests of simplicity.

HARQ Bundling

Data for transmission, such as from the infrastructure equipment 101 to the communications device 104, may be divided by the transmitter (e.g. the infrastructure equipment 101) into a plurality of blocks, such as transport blocks, before being transmitted.

At the receiver (e.g. the communications device 104), each block may be independently received and decoded. The receiver may determine, for each block, whether that block has been received correctly or not. For example, Cyclic Redundancy Check (CRC) bits may be added to each block by the transmitter and verified by the receiver. If the CRC check fails, the receiver may determine that the block was not correctly received.

Where a block has been determined not to have been received correctly, the receiver may receive subsequent retransmissions of the block.

A retransmission of a block may be decoded independently of previous transmissions. Alternatively, the decoding may be based on previously transmitted instances of the block and the most recent retransmission. For example, soft-combining is a well-known technique whereby a receiver maintains in a buffer the 'soft' bits resulting from an attempted decoding of a block. If the resulting decoding is not successful, then the soft bits are retained.

When a retransmission of the same block is received, the soft bits resulting from the decoding of the retransmission and the soft bits stored from the previous decoding attempt may be 'soft-combined' to improve the probability of successfully decoding the block.

In order to inform the transmitter about which blocks have been successfully received (e.g. which blocks have passed a CRC check after decoding), acknowledgement information may be transmitted by the receiver to the transmitter. The acknowledgement information may comprise a 'positive' acknowledgement ("ACK") indicating that a block was received correctly, a 'negative' acknowledgement ("NACK") indicating that a block has not been received correctly, or a combination of both.

In 3GPP, the use of acknowledgement information to trigger retransmissions which can be soft-combined with previous transmissions of a block is referred to as hybrid automatic repeat request ('ARQ'), or 'HARQ'.

In 3GPP Release 14, HARQ ACK-NACK bundling is supported. In HARQ ACK-NACK bundling, a single ACK/NACK status for multiple transport blocks is transmitted by the receiver of the data. The single ACK/NACK bit is calculated as a logical AND of the ACK/NACK bits for each of the transport blocks. That is, an ACK indication is transmitted if and only if all of the transport blocks have been received correctly. If one or more transport blocks have not been received correctly, then a NACK indication is transmitted. The NACK indication does not indicate which one or ones of the transport blocks have not been received correctly.

Figure 4:
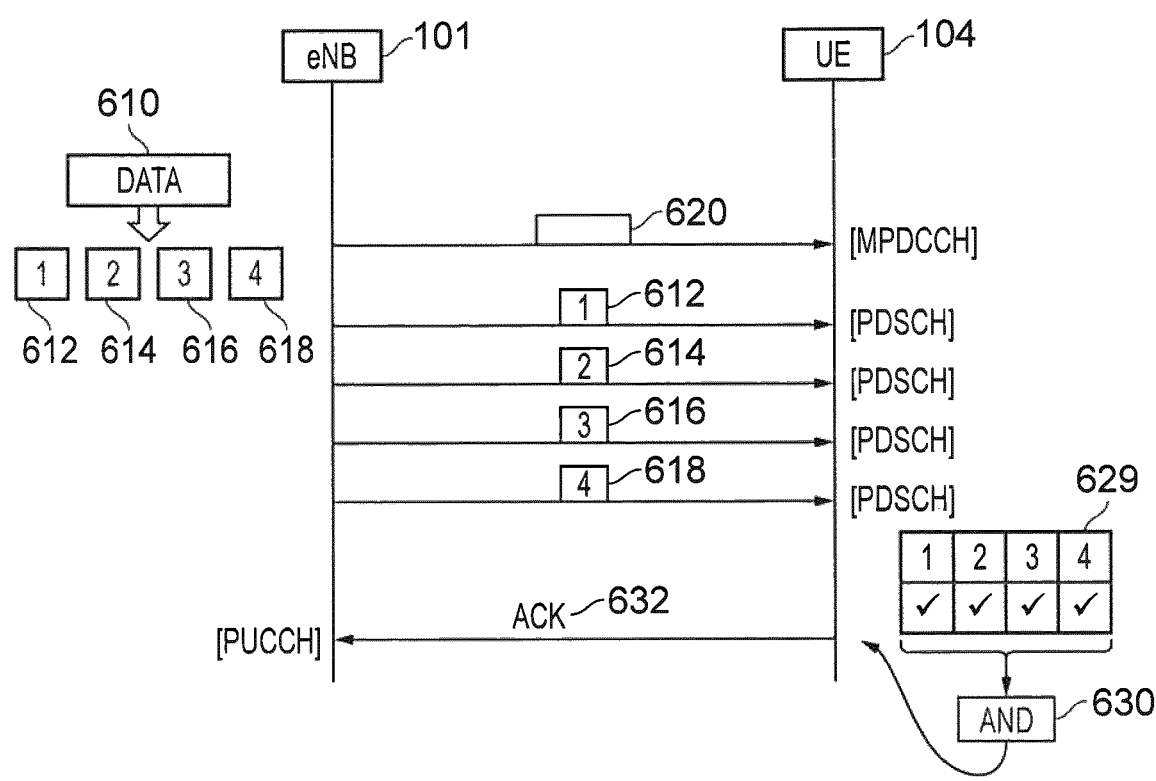
FIG. 4 illustrates an operation of a HARQ ACK-NACK procedure using HARQ bundling according to a conventional technique.

An example of the operation of conventional HARQ ACK-NACK bundling is shown in FIG. 4.

In the example of FIG. 4, at an eNodeB ('eNB') (which may be an example of infrastructure equipment 101), data 610 is divided to form four transport blocks 612, 614, 616, 618, illustrated as blocks with numbers 1 to 4 respectively.

The infrastructure equipment 101 transmits control information 620 on a Machine Type Communications (MTC) Physical Downlink Control Channel (MPDCCH), the control information 620 indicating communications resources associated with four instances of a physical downlink shared channel (PDSCH). In other words, communications resources are allocated for the transmission by the infrastructure equipment 101 of four transport blocks. In addition, the control information 620 may indicate communications resources on a physical uplink control channel (PUCCH) for the transmission of acknowledgement information. The indication of communications resources on the PUCCH may be implicit. For example, the allocated PUCCH may be associated with the MPDCCH candidate in the search space. In other words, there may be a predetermined mapping between MPDCCH candidates and PUCCHs. Based on which MPDCCH candidate was successfully received, the UE 104 (i.e. the receiver of the data blocks) applies the mapping to derive the PUCCH candidate.

One of the transport blocks 612, 614, 616, 618 is transmitted in the downlink in each of the instances of the PDSCH.

The receiver (which may be the UE 104) attempts to decode the four transport blocks 612, 614, 616, 618, and in the example of FIG. 4, is successful. Table 629 illustrates this by means of a tick (✓) for each of the four transport blocks.

The ACK/NACK status of all of the transport blocks 612, 614, 616, 618 carried by the PDSCH are combined through a logical AND function 630, creating a single 'bundled ACK/NACK indication' bit 632 that represents the ACK/NACK status of the bundle of transport blocks as a whole.

According to HARQ ACK/NACK bundling, an ACK is reported if all of the transport blocks are received correctly, otherwise a NACK is reported. A key benefit of HARQ ACK/NACK bundling is that successful reception of all data blocks can be reported by means of the transmission of a single 'ACK' bit of information. This can be of particular benefit in scenarios where the power consumption of the receiver of the data is limited, for example because it is remotely located and battery-powered. It is further of particular benefit if the path loss between the receiver and transmitter is high, meaning that transmitting a single 'ACK' bit of acknowledgement information reliably can require relatively high transmit power and/or a long transmission time, and therefore (or otherwise) require significant energy consumption; in such scenarios, the use of HARQ ACK/NACK bundling may significantly reduce the energy consumption compared with techniques in which an ACK indication is transmitted for each data block.

The single ACK bit 632 is transmitted on the PUCCH communications resources in the uplink by the receiver of the data (i.e. the UE 104).

A disadvantage of HARQ ACK/NACK bundling is that, in the event that one or more blocks is not received correctly, the transmitter has no information as to which one or ones of the blocks must be retransmitted.

An alternative to HARQ ACK/NACK bundling which overcomes this disadvantage is known as HARQ ACK/NACK multiplexing. In HARQ ACK/NACK multiplexing, multiple bits of acknowledgement information are transmitted on the PUCCH, one bit (indicating either ACK or NACK) for each block. Although this has the advantage of providing explicit information regarding which (if any) blocks were not received correctly, the transmission of multiple bits in a PUCCH either increases the power at which the PUCCH needs to be transmitted or reduces the reliability of the PUCCH. An additional disadvantage of HARQ ACK/NACK multiplexing is the specification and design impact on the structure of the PUCCH that is used to transmit the multiplexed HARQ ACK/NACK bits.

There is therefore a need to provide an improved mechanism for feedback from a receiver to a transmitter.

According to embodiments of the present disclosure, there is provided a method for a receiver, the method comprising receiving a first plurality of blocks transmitted by a transmitter using first communications resources, determining that at least one of the first plurality of blocks was not received correctly, in response to determining that at least one of the first plurality of blocks was not received correctly, transmitting to the transmitter a first negative acknowledgement (NACK) indication that at least one of the first plurality of blocks was not received correctly, the NACK indication not indicating which of the first plurality of blocks was not received correctly, receiving a subset of the first plurality of blocks retransmitted by the transmitter in response to the NACK indication using second communications resources, and after receiving the subset of the first plurality of blocks, determining whether all of the first plurality of blocks have been received correctly.

Embodiments of the present technique may find application in wireless telecommunications systems and equipment operating in accordance with protocols and procedures specified by the 3GPP organisation, including those resulting from 3GPP Release 15 work on Even Further Enhanced Machine Type Communications ("efeMTC") [4] and Further Enhanced Narrowband Internet of Things ("feNB-IoT") [5], and/or from work in Release 16 on Additional Machine Type Communications Enhancements ("A-MTC") [6] and Additional Enhancement for Narrowband Internet of Things ("A-NB-IoT") [7].

According to embodiments of the present technique transmissions of data are carried out by dividing the data into a plurality of data blocks, transmitting these to a receiver, and then receiving a single indication as to whether or not all of the received data blocks have been received correctly or not. In order to ensure efficient use of the communications resources the acknowledgement information indicates only either that all of the data blocks were received correctly or that one or more of the data blocks were not received correctly. The acknowledgment information does not indicate for each data block whether that data block was received correctly or not.

Subsequently, if the acknowledgement information indicated that one or more of the data blocks were not received correctly, the transmitter of the data retransmits a subset of the plurality of data blocks. The receiver then determines whether, in light of the retransmissions, it has received all of the data blocks correctly.

If it has, then it transmits acknowledgement information indicating this; if not, it transmits a NACK indication. As before, the NACK indication indicates only that one or more of the data blocks have not yet been received correctly, and does not indicate for each data block whether that data block was received correctly or not.

The steps of retransmitting by the transmitter and responding with acknowledgement information by the receiver may be repeated either a pre-determined number of times, or until the receiver determines that it has received all of the data blocks correctly and transmits an indication of this to the transmitter. At each repetition, the number of retransmitted blocks (i.e. the number of blocks in the retransmitted subset for that repetition) may be less than the total number of blocks, and the subset may differ from one repetition to the next. Preferably, in at least one repetition, the number of blocks in the retransmitted subset for that repetition is less than the total number of blocks. Preferably, in at least the first repetition (that is, the first repetition where one or more data blocks are retransmitted), the number of blocks in the retransmitted subset for that repetition is less than the total number of blocks.

Figure 5:
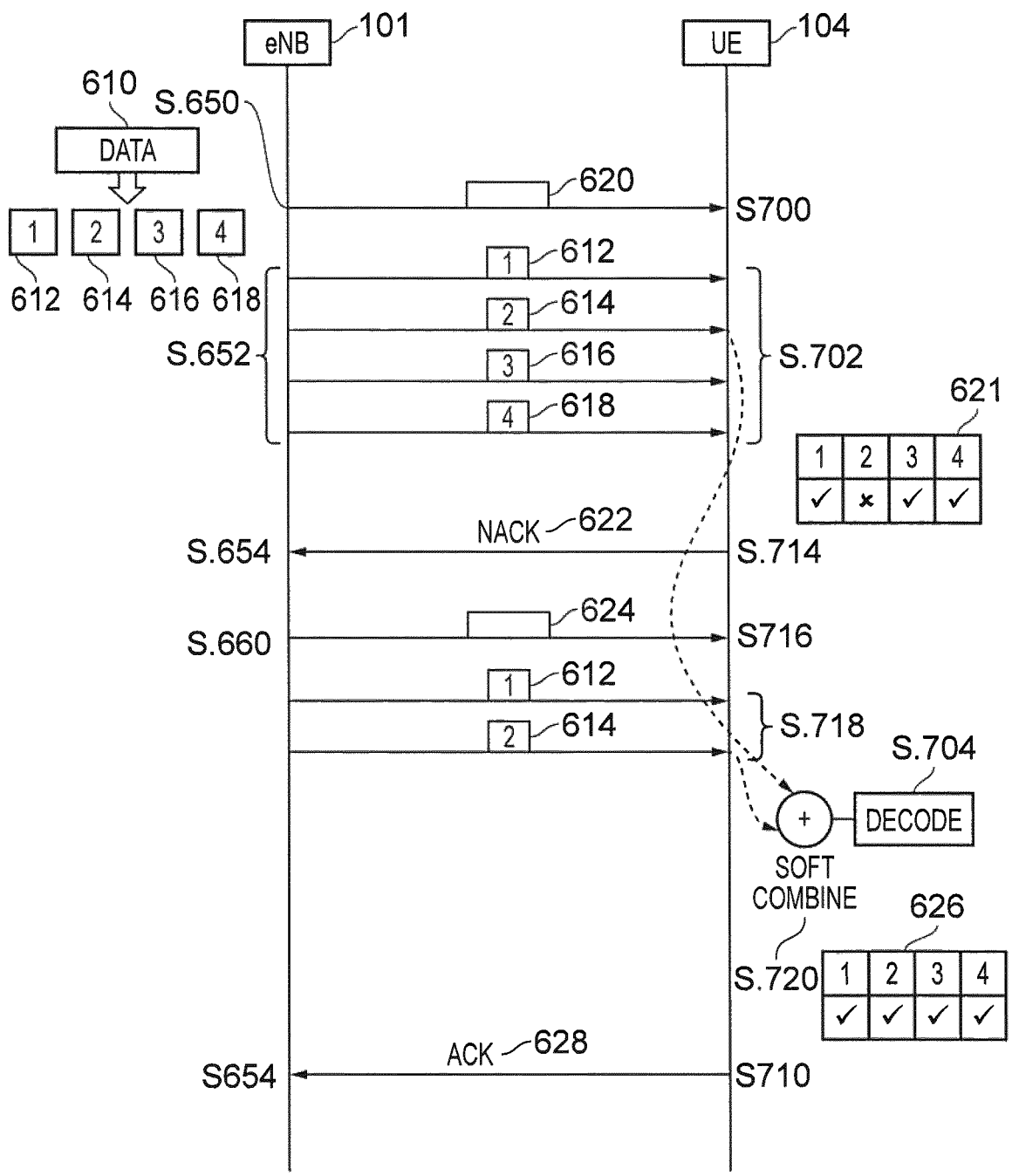
FIG. 5 illustrates a message sequence chart for transmitting data in accordance with embodiments of the present technique.

FIG. 5 illustrates a message sequence chart for transmitting data in accordance with embodiments of the present technique.

FIG. 5 shows transmissions between an eNB 101, which may be an example of infrastructure equipment, and a UE 104, which may be an example of a communications device. The infrastructure equipment/eNB 101 has the role of transmitter, i.e. it is the entity transmitting the data. The communications device/UE 104 has the role of receiver, i.e. it is the entity receiving the data. The skilled person will appreciate that the transmitter is not limited to only transmitting, but will necessarily receive signals, such as those representing feedback from the receiver. Similarly, the transmitter is also configured to transmit at least feedback to the receiver. Therefore, for clarity, the terms 'transmitter' and 'receiver' may be used in the present description to describe the entities which perform the transmitting and receiving, respectively, of the data.

Some elements of the sequence chart of FIG. 5 are labelled with reference numerals beginning with '5'; these correspond to respective steps in processes carried out by the infrastructure equipment 101 (acting as a transmitter) and by the communications device 104 (acting as a receiver) illustrated in FIG. 6 and FIG. 7 respectively, and are described in further detail below.

As in the example illustrated in FIG. 4, initially the data 610 is divided into four data blocks 612, 614, 616, 618 by the infrastructure equipment 101. The infrastructure equipment 101 allocates communications resources on a downlink shared channel for the transmission of the data blocks and allocates uplink communications resources for the transmission of acknowledgment information by the communications device 104.

The infrastructure equipment 101 transmits an indication of these communication resource allocations 620 to the communications device 104. It subsequently transmits at step S652 each of the data blocks 612, 614, 616 and 618. At the communications device 104 signals corresponding to the four data blocks are received and the communications device 104 attempts to decode each of the data blocks. In the example shown, the communications device 104 successfully decodes the first, third and fourth data blocks 612, 616 and 618. However the communications device 104 is unable to successfully decode the second data block 614.

The communication device 104 may make use of known techniques in order to determine that it has not successfully decoded a data block. For example, it may use bits within the data blocks which are provided in order to permit a receiver to determine whether the data block has been received and decoded correctly, such as bits generated in accordance with a cyclic redundancy check (CRC) scheme. As a result of the decoding attempts, the communications device 104 determines a status of each of the data blocks indicated by the table 621, in which a tick (✓) indicates that a data block is successfully decoded, and a cross (x) indicates that the data block was not successfully received.

In the example shown in FIG. 5, because one or more of the data blocks 612, 614, 616, 618 were not successfully received, the communications device 104 transmits, as a bundled ACK/NACK indication, a negative acknowledgment (NACK) indication 622 to the infrastructure equipment 101 using the communications resources allocated for that purpose and which were indicated by the infrastructure equipment 101 in the control information 620.

The infrastructure equipment 101, having received the NACK indication 622 thus determines that at least one of the data blocks 612, 614, 616, 618 was not successfully received by the communications device 104.

In response to this determination the infrastructure equipment 101 selects a subset of the data blocks for retransmission. In the example shown in FIG. 5 it selects the first and second blocks 612, 614. The infrastructure equipment 101 then allocates downlink communications resources for the retransmission of these two data blocks, and further uplink communications resources for the transmission of subsequent acknowledgment information by the communications device 104. These communication resources allocations are transmitted in a message 624 to the communications device 104.

In some embodiments the message 624 may further comprise an indication of the identity of the data blocks which are to be retransmitted using the indicated downlink communications resources. That is, in the example of FIG. 5 the message 624 may indicate that the first and second data blocks 612, 614 are to be retransmitted using the indicated downlink communications resources.

Subsequently, using the downlink communications resources indicated in the message 624, the infrastructure equipment 101 retransmits the first and second data blocks 612, 614.

At the communications device 104, the signals representing the message 624 and the retransmitted data blocks 612, 614 are received. The communications device 104 attempts to decode at least those data blocks which were not thus far successfully received.

Specifically, the communications device 104 may attempt to decode the second data block 614. In some embodiments it may attempt to perform soft combining of the soft data bits obtained as a result of (e.g. received in) the initial (or other previous) transmission and the soft data bits obtained as a result of (e.g. received in) the retransmission of the second data block 614. The communications device 104, using the combined bits from the two transmissions may thus attempt to decode the second data block 614. In the example of FIG. 5, this is successful and the acknowledgment status of the data blocks is updated as shown in the table 626, which shows that all of the data blocks 612, 614, 616, 618 have been successfully received. That is, the 'bundled ACK/NACK indication' is derived from all the data blocks 612, 614, 616, 618.

In response to determining that all of the data blocks have been successfully received, the communications device 104 transmits, as a bundled ACK/NACK indication, a positive acknowledgment 'ACK' indication 628 to the infrastructure equipment 101. Based on the ACK indication 628, the infrastructure equipment 101 determines that the communications device 104 has received all of the data blocks 612, 614, 616, 618 and that therefore no further retransmission is required.

It will be appreciated that in accordance with the present technique the amount of communications resources required for the retransmission of the data has been reduced compared to conventional techniques in which all of the data blocks may be retransmitted by the transmitter in response to a determination that one or more of the data blocks was not successfully received by the receiver. Furthermore, the present technique provides for efficient transmission of acknowledgment information, in that the negative acknowledgment information indication 622, and the positive acknowledgment indication 628 indicate only whether or not one or more of the plurality of data blocks 612, 614, 616, 618 have not been received correctly. This requires less communications resources than if positive and/or negative acknowledgment indications were sent in respect of each of the data blocks 612, 614, 616, 618.

Figure 6:
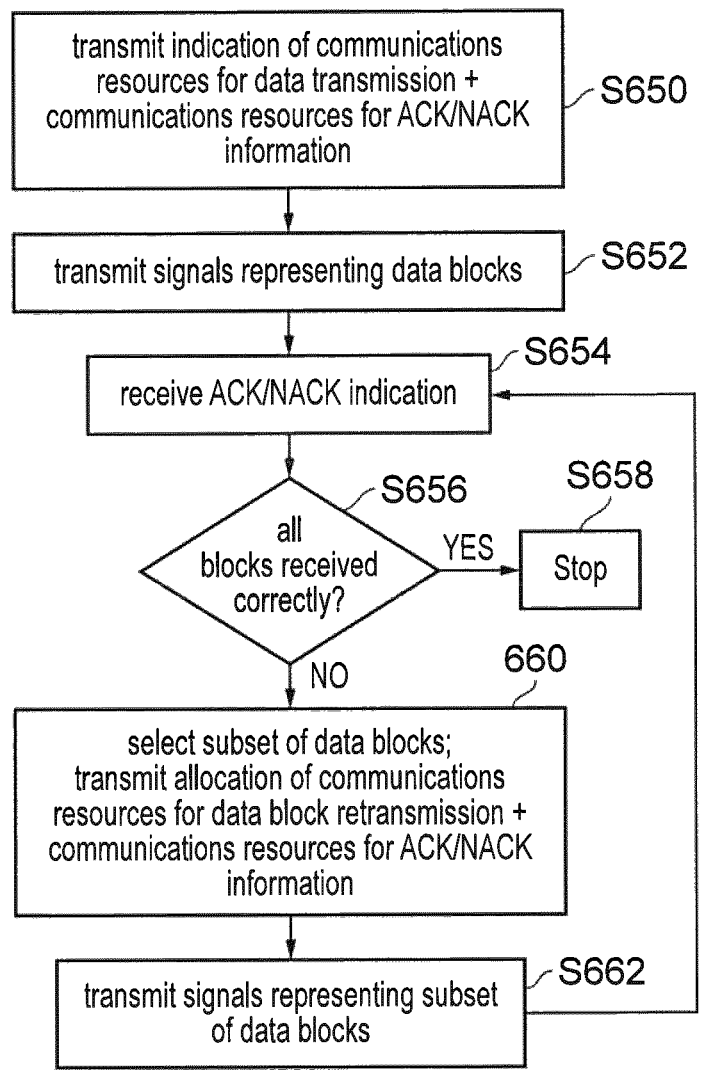
FIG. 6 illustrates a process flow chart for a transmitter of data in accordance with embodiments of the present technique.

FIG. 6 illustrates a process flow chart for a transmitter of data in accordance with embodiments of the present technique. This process may be implemented, for example by the infrastructure equipment 101 as shown in FIG. 5.

The process starts at step S650 at which the transmitter transmits an indication of a resource allocation for the transmission of a plurality of data blocks and an indication of a resource allocation for the transmission of acknowledgement information by the receiver of the data blocks.

The process then continues with step S652 in which the transmitter transmits first signals representing the plurality of data blocks using the communications resources indicated for the transmission of the data blocks in step S650.

The process continues with step S654, in which the transmitter receives acknowledgment information from the receiver of the data blocks, in the form of a bundled ACK/NACK indication. The bundled ACK/NACK indication may comprise a negative acknowledgement indication such as the negative acknowledgement indication 622 shown in FIG. 5. In any case the bundled ACK/NACK indication received in step S654 indicates whether or not all of the plurality of data blocks transmitted in step S652 have been received correctly by the receiver. If the bundled ACK/NACK indication is a NACK indication, then the bundled ACK/NACK indication does not indicate, for each of the data blocks, whether or not that data block was received correctly by the receiver.

The process continues with step S656 at which the transmitter determines, based on the bundled ACK/NACK indication, whether all of the data blocks have been received correctly by the receiver. If a positive determination is made, i.e. that all of the data blocks have been received correctly then the process continues with step S658 and the process terminates. If, at step S656 it is determined that one or more blocks have not been correctly received by the receiver then the process continues with step S660.

In step S660, the transmitter selects a subset of the data blocks, allocates communication resources for the retransmission of this subset, and allocates communications resources for the transmission of a subsequent bundled ACK/NACK indication. In step S660, the transmitter transmits an indication of these allocated communications resources to the receiver. The transmitter may also transmit an indication of which data blocks are included within the subset of data blocks which will be transmitted using the allocated downlink resources.

In some embodiments, the subset may be selected according to predetermined rules which are known to both the transmitter and the receiver. For example, the receiver may determine which blocks are within the subset based on the number of transport blocks for which PDSCH resources are allocated. For example, when the transmitter first determines that one or more blocks in a group has not been received correctly, the next selected subset may be a first N blocks in the group. If the process subsequently is repeated, the next selected subset may be the next M blocks in the group, and so on, where N and M may be determined by the receiver, for example based on the allocated PDSCH resources.

In some embodiments, in one or more repetitions of step S660, the subset may comprise all of the blocks within the group.

Control then passes to step S662.

In step S662, the transmitter transmits signals representing the subset of the plurality of data blocks which was determined at step S660.

The process then continues with step S654 and the process repeats until the transmitter has determined based on received acknowledgment information from the receiver that the receiver has received all of the data blocks correctly.

In the example shown in FIG. 5, the transmitter, being the infrastructure equipment 101, receives the positive acknowledgment indication 628 and thus is able to determine at step S656 that all of the data blocks have been received correctly by the receiver.

Figure 7:
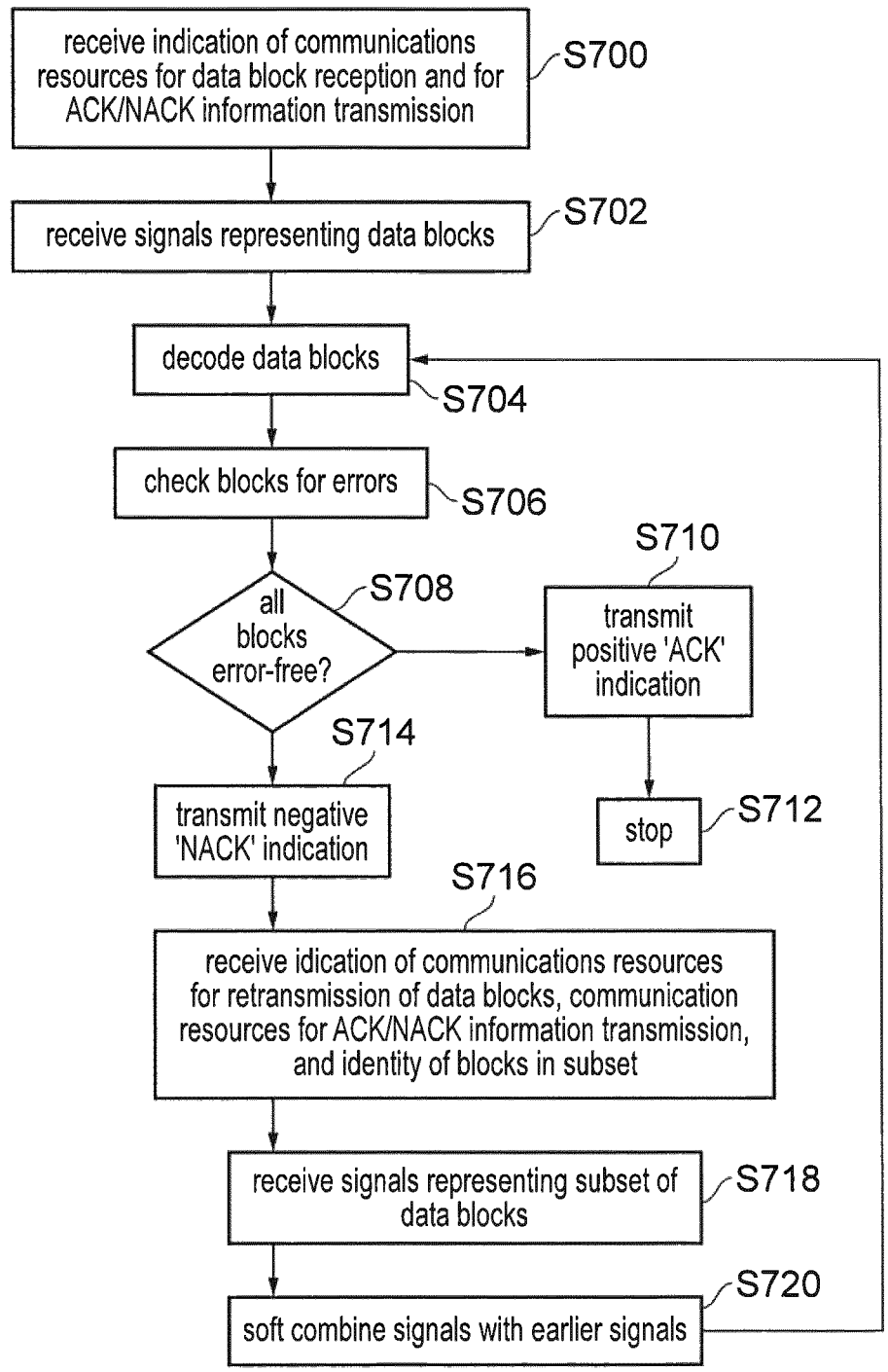
FIG. 7 illustrates a process flow chart for a receiver of data in accordance with embodiments of the present technique.

FIG. 7 illustrates a process which may be followed by a receiver, which may be the communications device 104 shown in FIG. 5, in accordance with embodiments of the present technique.

The process starts at step S700 in which the receiver receives control information comprising an indication of an allocation of communications resources for the reception of signals representing data blocks and an indication of an allocation of communications resources for transmitting acknowledgement information.

The process continues at step S702 in which the receiver receives a first set of signals representing the plurality of data blocks, the signals being received on the communications resources indicated at step S700.

At step S704 the receiver attempts to decode the data blocks based on the signals received in step S702.

In step S706, the receiver determines whether or not the data blocks have been successfully received. As described above in respect of FIG. 5 this may be by means of the use of a CRC check.

At step S708 the receiver determines whether all of the blocks have been received correctly. If all of the blocks have been received correctly then control passes to step S710 in which the receiver transmits a bundled ACK/NACK indication comprising a positive acknowledgement (ACK) indication which indicates to the transmitter of the data blocks that all of the data blocks have been received correctly. Control then passes to step S712 at which the process terminates.

If at step S708, it is determined that one or more blocks have not been received correctly, for example, based on a failure of a CRC check in respect of one or more of the blocks, then control passes to step S714.

In step S714 the receiver transmits, using the communications resources allocated for the acknowledgement information in step S700, a bundled ACK/NACK indication comprising a negative acknowledgment indication (NACK) which indicates that one or more of the blocks received in step S702 has not yet been received correctly. Note that the negative acknowledgement indication does not indicate which of the blocks have not been received correctly, but merely indicates that at least one of them has not been received correctly so far.

Control then passes to step S716, in which the receiver receives control information comprising an indication of communications resources on which a subset of the data blocks are to be retransmitted and an indication of communications resources on which a subsequent bundled ACK/NACK indication may be transmitted.

Control then passes to step S718, in which the receiver receives signals representing the subset of data blocks. In step S718 the signals are received using the communications resources indicated in step S716.

Control then passes to step S720, in which the receiver may optionally combine soft bits received during step S718, and soft bits received during step S702, or during an earlier iteration of step S718, which relate to the same data block. This may improve the probability of successfully decoding the respective data block.

Control then returns to step S704 at which the receiver attempts to decode at least those data blocks which have so far not been successfully decoded.

The process then continues until, at step S708, the receiver determines that all of the data blocks have been received correctly. This may for example mean that all of the data blocks have successfully passed a CRC check.

In some embodiments of the present technique, data blocks transmitted initially using communications resources (such as on a PDSCH) allocated by a single control information transmission (e.g. in a single MPDCCH instance) may be divided into groups, with each group comprising a plurality of data blocks, and each group having an associated allocated PUCCH instance, at least after the first transmission of the data blocks.

Figure 8:
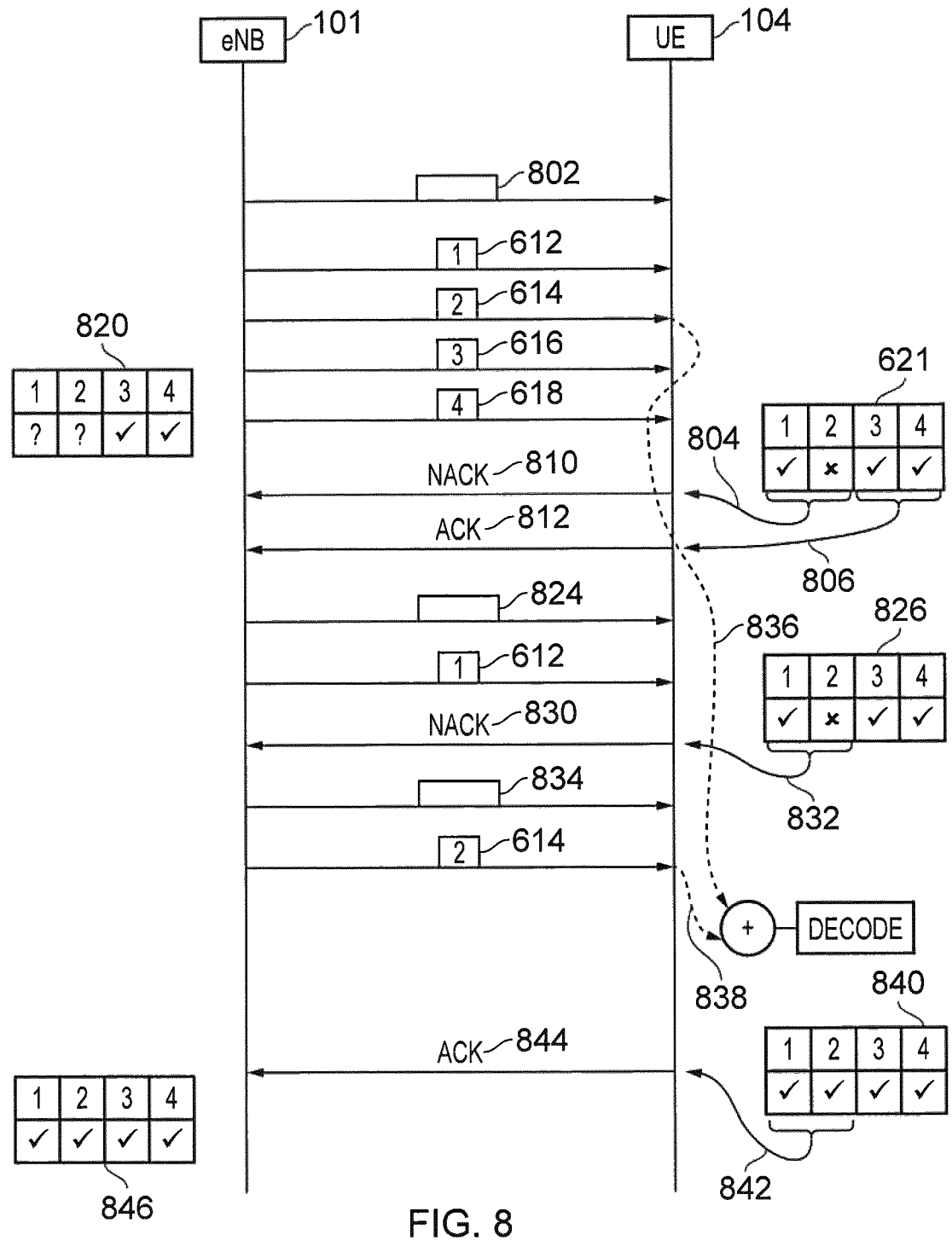
FIG. 8 is a message sequence chart illustrating a transmission of data in accordance with embodiments of the present technique.

FIG. 8 is a message sequence chart illustrating the behaviour of the transmitter and receiver according to such embodiments.

As in the example of FIG. 4, the data 610 is initially divided into four transport blocks 612, 614, 616, 618, however this step is not shown in FIG. 8 for clarity.

The four transport blocks 612, 614, 616, 618 are then grouped into two groups; the first group comprising the first and second transport blocks 612, 614, and the second group comprising the third and fourth transport blocks 616, 618.

The grouping of transport blocks into groups may be carried out in accordance with a predetermined (e.g. standardised) scheme. For example, in some embodiments, an bundled ACK/NACK indication is limited to refer to at most four transport blocks, and each group except the last group contains four transport blocks, with the last group containing four or fewer transport blocks.

In some embodiments, the communications device 104 determines which data blocks or transport blocks are associated with which PUCCH and are therefore within the same group. For example, if there are M PUCCH and N data blocks, the first floor(N/M) data blocks are associated with the first PUCCH, the second floor(N/M) data blocks are associated with the second PUCCH and so on, with any remaining data blocks being associated with the M'th PUCCH.

Alternatively, in some embodiments the infrastructure equipment 101 may use radio resource control (RRC) signalling (which may be broadcast or UE/communications device-specific) which indicates a mapping between the number of data blocks and number of PUCCH (i.e. number of groups) and indicates which data blocks' acknowledgement status is to be taken into account in forming each bundled ACK/NACK indication transmitted on a PUCCH.

The infrastructure equipment 101 transmits control information 802 using the MPDCCH. As with the control information 602 described above in respect of FIG. 4 and FIG. 5, the control information 802 comprises an indication of PDSCH communications resources allocated for the initial transmission of the transport blocks 612, 614, 616, 618. However, the control information 802 indicates communications resources on PUCCH sufficient for the transmission of two bundled ACK/NACK indications. These resources for the transmission of two bundled ACK/NACK indications may comprise a single PUCCH instance in which two bundled ACK/NACK indications are to be transmitted, or multiple PUCCH instances.

The control information 802 may additionally contain an indication of which blocks in the set of blocks are to be transmitted. This may be by means of a bitmap, where each bit corresponds to a block in the set of blocks 612, 614, 616, 618. In the example of FIG. 8, all of the blocks are to be transmitted using the indicated PDSCH resources, and the bitmap may thus indicate '1111'.

The infrastructure equipment 101 then transmits the transport blocks 612, 614, 616, 618, as in the previous examples, and the communications device 104 determines whether or not it has received each of the transport blocks correctly.

In response to determining whether or not it has received each of the transport blocks correctly, the communications device 104 then determines one acknowledgement status for each group of transport blocks.

In the example of FIG. 8, the first, third and fourth transport blocks 612, 616, 618 are received correctly, but the second transport block 614 was not successfully decoded.

Using the logical 'AND' approach described above, the first acknowledgement indication, corresponding to the first group of transport blocks, is then determined. Since one or more of the first group of transport blocks was not received correctly, the first acknowledgement indication is set to be a NACK indication.

The second acknowledgement indication, corresponding to the second group of transport blocks, is then determined. Since all of the second group of transport blocks were received correctly, the second acknowledgement indication is set to be an ACK indication.

A NACK indication 810 corresponding to the first group of transport blocks (i.e. the blocks 612, 614) (as indicated by the arrow 804) is transmitted using one instance of PUCCH, and an ACK indication 812 corresponding to the second group of transport blocks (i.e. the blocks 616, 618) (as indicated by the arrow 806) is transmitted using another instance of PUCCH. The instances of PUCCH correspond to the communications resources on PUCCH indicated in the control information 802.

At the infrastructure equipment 101, the reception of the NACK indication 810 and the ACK indication 812 indicates that both the third and fourth transport blocks 616, 618 have been received correctly by the communications device 104, while at least one of the first and second transport blocks 612, 614 have not been received correctly by the communications device 104, as indicated by the table 820.

Accordingly, the infrastructure equipment 101 determines that there is no need to retransmit either the third or the fourth transport block 616, 618.

The infrastructure equipment may accordingly proceed broadly in a similar manner to the process illustrated in FIG. 5, in which the group of data blocks to be sent consists only of those data blocks in groups where one or more data blocks have not been received correctly by the receiver. In the example of FIG. 8, this corresponds to the first and second data blocks 612, 614.

The infrastructure equipment 101 transmits further control information 824 on the MPDCCH, indicating communications resources on the PDSCH for the transmission of a subset of the group of data blocks. In this case, the group of data blocks consists of the first and second data blocks 612, 614, and the subset contains only the first data block 612.

The further control information 824 indicates communications resources on PUCCH for a transmission of acknowledgement information. The further control information 824 additionally indicates, for example by means of a bitmap, which data blocks are in the subset will be retransmitted using the indicated PDSCH resources. The bitmap may be based on the original set of data blocks, i.e. having one bit for each of the four data blocks 612, 614, 616, 618 and therefore in the example of FIG. 8, the further control information 824 may comprise a bitmap of '1000', indicating that only the first data block 612 is to be retransmitted. In some embodiments, the bitmap may refer only to blocks which are in groups where one or more blocks have been indicated as not yet correctly received and therefore, in the example of FIG. 8, the further control information 824 may comprise a bitmap of '10'.

Subsequently, the infrastructure equipment 101 retransmits the first data block 612.

Based on the indicated bitmap in the further control information 824, the communications device 104 may determine which data blocks are to be retransmitted, and may further determine which (if any) of the retransmitted block(s) is/are ones which it has already successfully received.

If, as in the case of the example illustrated in FIG. 8, the communications device 104 determines that the only retransmitted block is the first block 612, which it has already successfully received, the communications device 104 may refrain from attempting to decode the corresponding retransmission of the first data block 612.

In any case, since the second data block 614 was not retransmitted, the status at the communications device 104 after the retransmission of the first data block 612 is as shown in table 826: i.e. the first, third and fourth transport blocks 612, 616, 618 have been received correctly, but the second transport block 614 has not been successfully decoded.

Following the same principle as before, the communications device 104 determines, based on the acknowledgement status for the blocks of the first group, that the appropriate response is a NACK indication 830 (indicated by the arrow 832). The NACK indication 830 is thus transmitted by the communications device 104 to the infrastructure equipment 101.

In some embodiments, at each repetition of the process, the communications device 104 determines and sends acknowledgement information in respect of each group of blocks. However, preferably (and as shown in the example of FIG. 8), once the successful reception of all blocks in a group has been determined and reported to the infrastructure equipment 101, no further acknowledgement information is transmitted in respect of that group.

Following the reception of the NACK indication 830, the status information at the infrastructure equipment 101 is unchanged and is as shown in table 820.

In the next repetition of the process, the infrastructure equipment 101 selects, as the subset of the first group, the second data block 614 for retransmission. This is retransmitted using PDSCH communications resources indicated in third control information 834. The third control information 834 may further contain an indication that the block(s) to be retransmitted is the second data block 614. This may be by means of a bitmap of '0100', for example.

Following the retransmission of the second data block 614, the communications device 104 may decode the second data block 614. In the example shown in FIG. 8, this is done successfully.

As described above, soft-combining based on the initial and subsequent retransmission of the second data block 614 may be used to improve the probability of successful decoding, as indicated by the arrows 836 and 838.

Following the successful decoding of the second data block 614, the status at the communications device 104 is as shown in table 840 i.e. all blocks have been successfully received. The communications device 104 then determines that an ACK indication 844 is to be sent to the transmitter, based on the status of the constituent blocks within the first group i.e. blocks 612, 614, as indicated by the arrow 842. The ACK indication 844 is then transmitted by the communications device 104 to the infrastructure equipment 101.

On receipt of the ACK indication 844, the infrastructure equipment 101 determines that all blocks of the first group have been successfully received and therefore that all of the blocks 612, 614, 616, 618 have been successfully received, as shown by the table 846, and the process terminates.

In some embodiments, a 'group ACK' indication may be transmitted by the transmitter to the receiver to indicate that the bundled ACK/NACK indication transmitted by the receiver is to be based on all of the data blocks which were transmitted initially. For example, in the example of FIG. 5, the control information 620 may comprise a 'group ACK' indication that the bundled ACK/NACK indication which is transmitted by the transmitter is to reflect the acknowledgement status of all four of the data blocks 612, 614, 616, 618.

In some embodiments, a 'subset ACK' indication may be transmitted by the transmitter to the receiver to indicate that the bundled ACK/NACK indication transmitted by the receiver is to be based on only the data blocks in the subset which was most recently transmitted. For example, in the example of FIG. 5, the control information 624 may comprise a 'subset ACK' indication, which indicates that the next bundled ACK/NACK indication which is transmitted by the transmitter is to reflect the acknowledgement status of only the first and second of the data blocks 612, 614, these being the data blocks in the subset which are retransmitted.

In the latter case, the receiver (e.g. the communications device 104), in response to receiving a subset ACK indication may determine that the bundled ACK/NACK indication is to be an ACK indication, or a NACK indication as the case may be, based only on the acknowledgement status of the blocks which were most recently retransmitted.

For example, in the example of FIG. 5, if the control information 624 received at step S716 comprised a subset ACK indication, then at step S710 the receiver determines that the bundled ACK/NACK indication 628 comprising acknowledgement information should be an 'ACK' indication, based on the acknowledgement status of the first and second data blocks 612, 614.

In some embodiments, a group ACK indication or subset ACK indication may apply to all subsequently transmitted acknowledgement information which is sent as a bundled ACK/NACK indication; in some embodiments, the group ACK indication or subset ACK indication may apply only to the next transmitted acknowledgement information which is sent as a bundled ACK/NACK indication.

In some embodiments, a single bit may indicate either (e.g. by a '0') a group ACK indication or (e.g. by a '1') a subset ACK indication.

In some embodiments of the present technique, a 'bundled ACK/NACK' indication is transmitted, as described above and, in addition or alternatively, one or more block-specific ACK/NACK indications are transmitted.

In some such embodiments, only block-specific ACK/NACK indications (and no bundled ACK/NACK indication) are transmitted if one or more blocks has not yet been successfully received.

In some embodiments, only block-specific NACK indications, which indicate that a specific block has not yet been successfully received, are transmitted and block-specific ACK indications (which indicate that a specific block has been successfully received) are not transmitted.

Accordingly, in some embodiments, the transmitter (e.g. the infrastructure equipment 101 of FIG. 5) may allocate communications resources for not only a transmission of a bundled ACK/NACK indication but also for a transmission of a number of block-specific ACK/NACK indications. The number of block-specific ACK/NACK indications to be sent (and for which resources may be allocated) may be equal to the total number of blocks to be transmitted, or may be equal to the number of blocks transmitted in the present repetition of the procedure.

In some embodiments, the bundled ACK/NACK indication uses a different PUCCH resource to that used for the individual block-specific ACK/NACK indications. In other words, a first PUCCH resource is used for the bundled ACK/NACK indication and second PUCCH resources are allocated for the block-specific ACK/NACK indications. In some such embodiments, if all the blocks have been received correctly then the communications device 104 uses the first PUCCH resource to transmit a single bundled ACK/NACK indication indicating that all blocks have been successfully received. Otherwise, the communications device 104 uses the second PUCCH resources to transmit one block-specific ACK/NACK for each of the blocks. Thus, the amount of transmission by the communications device 104 may be reduced.

Figure 9:
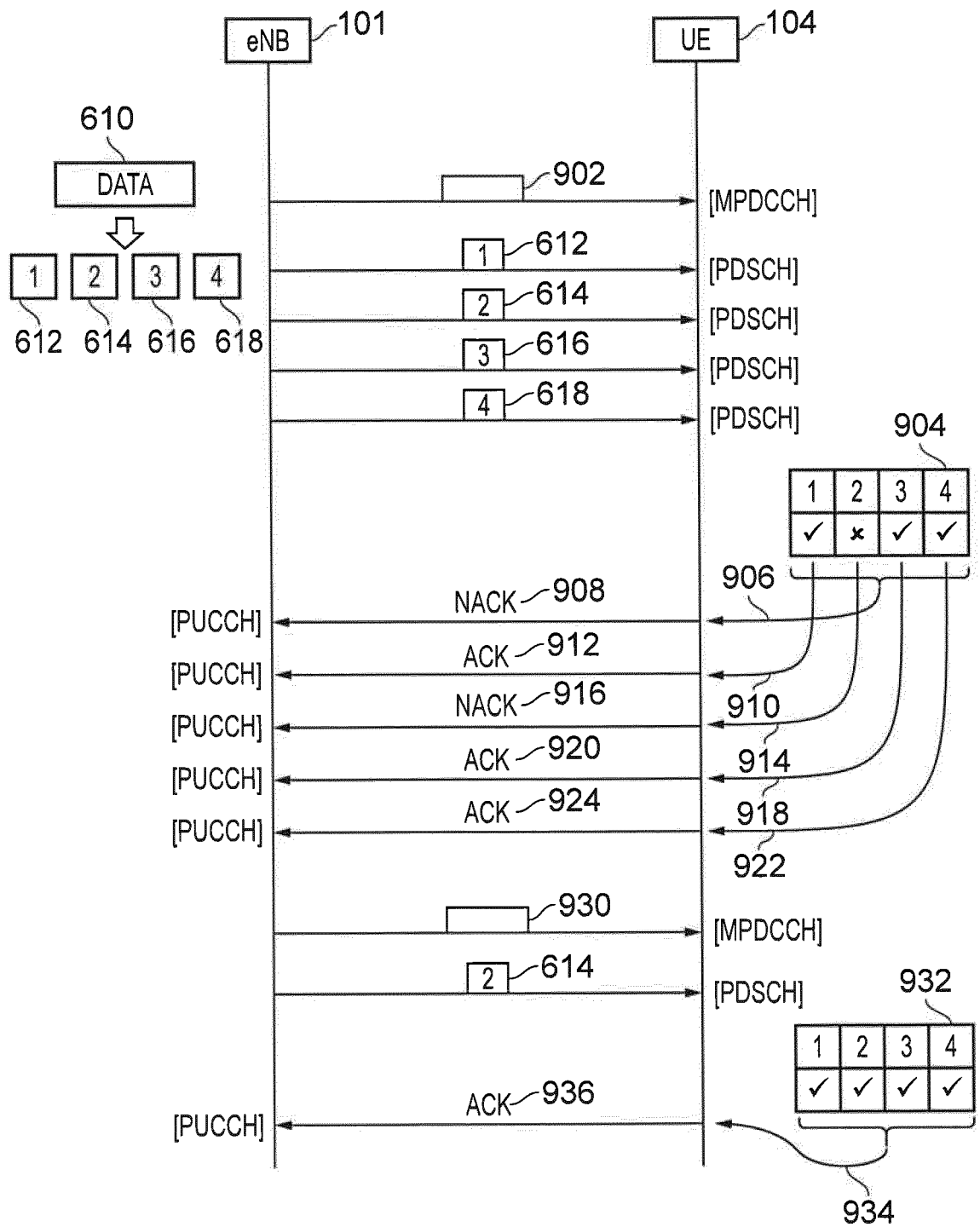
FIG. 9 is a further message sequence chart illustrating a transmission of data in accordance with embodiments of the present technique.

An example of an embodiment of the present technique is illustrated in FIG. 9.

As in FIG. 5, the process starts with the division of the data 610 into four data blocks 612, 614, 616, 618. The infrastructure equipment 101 transmits control information 902 which is broadly similar to the control information 602 described above in respect of FIG. 4. However, in addition, the control information 902 indicates communications resources on PUCCH for the transmission of four block-specific ACK indications, in addition to a bundled ACK/NACK indication. The indication of the communications resources on PUCCH for the transmission of the four block-specific ACK indications may be implicit, e.g. it may be derived by the receiver based on the communications resources allocated for the bundled ACK/NACK indication.

The infrastructure equipment 101 transmits the four data blocks as in the example of FIG. 5, and the communications device 104 determines whether each has been received correctly or not.

In the example of FIG. 9, the second data block 614 is not received correctly, but the first, third and fourth blocks are correctly received, as indicated by the table 904.

As in the example of FIG. 5, the communications device 104 transmits a NACK indication 908, corresponding to the NACK indication 622 of FIG. 5, reflecting the fact that one or more of the group of data blocks was not received correctly, as indicated by the arrow 906.

However, in addition, using PUCCH resources indicated in the control information 902, the communications device 104 transmits three block-specific ACK indications 912, 920, 924 reflecting the successful reception of the first, third and fourth blocks respectively (as indicated by the arrows 910, 918, and 922). Furthermore, using the PUCCH resources indicated in the control information 902, the communications device 104 transmits a block-specific NACK indication 918 indicating that the second block has not yet been successfully received (as indicated by the arrow 914).

By receiving these block-specific ACK/NACK indications 912, 916, 920, 924, the infrastructure equipment 101 determines that all of the blocks except the second block 614 have been successfully received.

Accordingly, when selecting the subset of blocks to retransmit, it selects only the second block 614. The infrastructure equipment 101 determines the communications resources for the downlink transmission and indicates these in the second control information 930. The second control information 930 may comprise an indication of communications resources for the transmission of a bundled ACK/NACK indication and (because only one block is being retransmitted) one block-specific ACK/NACK indication. The infrastructure equipment 101 then retransmits the second block 614.

In the example of FIG. 9, the communications device 104 determines that it has successfully received the second block 614, for example as a result of soft-combining the soft bits from the initial transmission and the retransmission of the second block. The acknowledgement status of the four blocks at the communications device 104, as shown in table 932, thus indicates that all blocks have been successfully received.

The communications device 104 then transmits a bundled ACK indication 936 indicating that all blocks have been successfully received, and does not transmit any block-specific ACK/NACK indication.

If instead, the second data block 614 had instead been successfully received by the communications device 104 on its initial transmission, the communications device 104 would have transmitted an ACK indication on PUCCH instead of the NACK indication 908. This ACK indication would indicate that all of the data blocks in the group had been successfully received. The communications device 104 would in such a scenario not transmit individual (i.e. block-specific) ACK/NACK indications 912, 916, 920, 924 since it would be evident to the infrastructure equipment based on the ACK indication that each of the data blocks had been successfully received by the communications device. Hence the communications device 104 would save the energy necessary to transmit the PUCCH associated with the block-specific ACK/NACK indications 912, 916, 920, 924.

As described above, in some embodiments, block-specific ACK/NACK indications may be transmitted as well as, or instead of, bundled ACK/NACK indications where PDSCH resources for the transmission of multiple blocks are indicated by a single MPDCCH transmission.

In order to improve the probability of successful reception of the block-specific ACK/NACK indications, each block-specific ACK/NACK indication may be repeated on PUCCH. For example, each block-specific ACK/NACK indication may be transmitted 128 times.

In some embodiments, repeated transmissions of block-specific ACK/NACK indications may be interleaved. Thus, instead of transmitting all repetitions of a first block-specific ACK/NACK, followed by all repetitions of a second block-specific ACK/NACK, and so on, a subset of the repetitions of the first block-specific ACK/NACK is followed by a subset of the repetitions of the second block-specific ACK/NACK. Once a subset of repetitions of each of the block-specific ACK/NACK indications has been transmitted, the process repeats until the desired number of repetitions of each of the block-specific ACK/NACK indications has been transmitted.

For example, if each block-specific ACK/NACK indication is to be transmitted 128 times, then the first block-specific ACK/NACK indication may be transmitted 64 times, followed by the second block-specific ACK/NACK indication being transmitted 64 times and so on. When all of the block-specific ACK/NACK indications have been transmitted 64 times, then the first block-specific ACK/NACK indication may be transmitted a further 64 times, and so on.

This method of transmission of multiple PUCCH may improve decoding performance if time-dependent fading occurs. This pattern of transmission provides increased time diversity of each of the PUCCH, hence increasing the reliability of the PUCCH.

The skilled person will appreciate that aspects associated with different embodiments may be combined in ways other than are described explicitly in the present description. In particular, with respect to the processes illustrated in FIG. 6 and FIG. 7, these processes may be modified by re-ordering, adding, or removing steps without departing from the scope of the present technique.

For example, in some embodiments, communications resources for the transmission or retransmission of the data blocks, and/or for the transmission of ACK/NACK indications may be allocated implicitly. For example, communications resources allocated for the transmission of an ACK/NACK indication may be derived according to a predetermined rule, based on, for example, communications resources used for the transmission of the control information, and/or communications resources used for the transmission of the data blocks. In some embodiments, no control information is sent prior to a transmission of the data blocks. In some embodiments, communications resources are not allocated in advance; for example, they may be determined opportunistically by the entity performing the transmission.

Although embodiments have been described in the context of a wireless communications network having a wireless access interface provided by an infrastructure equipment, the present technique is not so limited and may find application in, for example, ad-hoc networks, peer-to-peer or device-to-device communications.

A retransmission of a data block may comprise a transmission of substantially the same encoded bits as transmitted initially (or previously), or may comprise a transmission of different encoded bits derived from the same data, in accordance with, for example, the use of different redundancy versions in conventional HARQ techniques.

Thus there has been described a method for a receiver, the method comprising receiving a first plurality of blocks transmitted by a transmitter using first communications resources, determining that at least one of the first plurality of blocks was not received correctly, in response to determining that at least one of the first plurality of blocks was not received correctly, transmitting to the transmitter a first negative acknowledgement (NACK) indication that at least one of the first plurality of blocks was not received correctly, the NACK indication not indicating which of the first plurality of blocks was not received correctly, receiving a subset of the first plurality of blocks retransmitted by the transmitter in response to the NACK indication using second communications resources, and after receiving the subset of the first plurality of blocks, determining whether all of the first plurality of blocks have been received correctly.

There has also been described a method for a receiver, the method comprising: receiving a first plurality of blocks transmitted by a transmitter using first communications resources, determining whether at least one of the first plurality of blocks was not received correctly, if at least one of the first plurality of blocks was not received correctly then, for each block which was not received correctly, transmitting a corresponding block-specific negative acknowledgement indication, the block-specific negative acknowledgement indication indicating that the corresponding block of the first plurality of blocks was not received correctly, and if all of the first plurality of blocks were received correctly, transmitting to the transmitter a positive acknowledgement (ACK) indication indicating that all of the first plurality of blocks have been received correctly by the receiver.

There has also been described a method for a receiver, the method comprising: receiving control information indicating first communications resources and second communications resources receiving a first plurality of blocks transmitted by a transmitter using the first communications resources, receiving a second plurality of blocks transmitted by the transmitter using the second communications resources, determining that at least one of the first plurality of blocks was not received correctly, in response to determining that at least one of the first plurality of blocks was not received correctly, transmitting to the transmitter a first negative acknowledgement (NACK) indication that at least one of the first plurality of blocks was not received correctly, the NACK indication not indicating which of the first plurality of blocks was not received correctly, determining that at least one of the second plurality of blocks was not received correctly, in response to determining that at least one of the second plurality of blocks was not received correctly, transmitting to the transmitter a second negative acknowledgement (NACK) indication that at least one of the second plurality of blocks was not received correctly, the second NACK indication not indicating which of the second plurality of blocks was not received correctly.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method for a receiver, the method comprising: receiving a first plurality of blocks transmitted by a transmitter using first communications resources, determining that at least one of the first plurality of blocks was not received correctly, in response to determining that at least one of the first plurality of blocks was not received correctly, transmitting to the transmitter a first negative acknowledgement (NACK) indication indicating that at least one of the first plurality of blocks was not received correctly, the NACK indication not indicating which of the first plurality of blocks was not received correctly, receiving a subset of the first plurality of blocks retransmitted by the transmitter in response to the NACK indication using second communications resources, and after receiving the subset of the first plurality of blocks, determining whether all of the first plurality of blocks have been received correctly.

Paragraph 2. A method according to paragraph 1, the method comprising: in response to determining whether all of the first plurality of blocks have been received correctly after receiving the subset of the first plurality of blocks, if all of the first plurality of blocks have been received correctly, transmitting a positive acknowledgement (ACK) indication to the transmitter, the ACK indication indicating that all of the first plurality of blocks have been received correctly, and if not all of the first plurality of blocks have been received correctly, transmitting a second NACK indication to the transmitter which does not indicate which of the first plurality of blocks have not been received correctly.

Paragraph 3. A method according to paragraph 1 or paragraph 2, wherein determining that at least one of the first plurality of blocks was not received correctly comprises determining which of the first plurality of blocks was not received correctly, and the method comprises: for each block which was not received correctly, transmitting a corresponding block-specific negative acknowledgement indication, the block-specific negative acknowledgement indication indicating that the corresponding block of the first plurality of blocks was not received correctly.

Paragraph 4. A method according to paragraph 3, the method comprising: for each block which was received correctly, transmitting a corresponding block-specific positive acknowledgement indication, the block-specific positive acknowledgement indication indicating that the corresponding block of the first plurality of blocks was received correctly.

Paragraph 5. A method according to any of paragraphs 1 to 4, wherein each block in the first plurality of blocks comprises error detection bits for detecting, by the receiver, whether the block after decoding by the receiver contains one or more errors, and the determining that the at least one of the first plurality of blocks was not received correctly comprises determining based on the error detection bits of the decoded block that the at least one of the decoded blocks contains one or more errors.

Paragraph 6. A method according to any of paragraphs 1 to 5, the method comprising: before receiving the first plurality of blocks, receiving control information indicating the first communications resources.

Paragraph 7. A method according to paragraph 6, wherein the control information indicates third communications resources, the method comprising: receiving a second plurality of blocks transmitted by the transmitter using the third communications resources, determining that at least one of the second plurality of blocks was not received correctly, in response to determining that at least one of the second plurality of blocks was not received correctly, transmitting to the transmitter a third negative acknowledgement (NACK) indication indicating that at least one of the second plurality of blocks was not received correctly, the third NACK indication not indicating which of the second plurality of blocks was not received correctly.

Paragraph 8. A method according to any of paragraphs 1 to 7, the method comprising: receiving second control information transmitted by the transmitter in response to the NACK indication, the second control information comprising one or more of an indication of which of the first plurality of blocks are within the subset of the first plurality of blocks and an indication of the second communications resources.

Paragraph 9. A method for a transmitter, the method comprising: transmitting a first plurality of blocks to a receiver using first communications resources, receiving from the receiver a first negative acknowledgement (NACK) indication indicating that at least one of the first plurality of blocks was not received correctly, the NACK indication not indicating which of the first plurality of blocks was not received correctly, and in response to receiving the NACK indication, retransmitting a subset of the first plurality of blocks to the receiver using second communications resources.

Paragraph 10. A method according to paragraph 9, the method comprising after retransmitting the subset of the first plurality of blocks to the receiver using the second communications resources, receiving a second NACK indication from the receiver which does not indicate which of the first plurality of blocks have not been received correctly.

Paragraph 11. A method according to paragraph 9 or paragraph 10, the method comprising: after retransmitting the subset of the first plurality of blocks to the receiver using the second communications resources, receiving a positive acknowledgement (ACK) indication to the transmitter, the ACK indication indicating that all of the first plurality of blocks have been received correctly.

Paragraph 12. A method according to any of paragraphs 9 to 11, the method comprising for each block which was not received correctly by the receiver, receiving a corresponding block-specific negative acknowledgement indication.

Paragraph 13. A method according to any of paragraphs 9 to 12, the method comprising: for each block which was received correctly by the receiver, receiving a corresponding block-specific positive acknowledgement indication.

Paragraph 14. A method according to any of paragraphs 9 to 13, wherein each block in the first plurality of blocks comprises error detection bits for detecting, by the receiver, whether the block after decoding by the receiver contains one or more errors.

Paragraph 15. A method according to any of paragraphs 9 to 14, the method comprising: transmitting control information, the control information indicating the first communications resources.

Paragraph 16. A method according to paragraph 15, wherein the control information indicates third communications resources, the method comprising transmitting a second plurality of blocks to the receiver using the third communications resources, and receiving from the receiver a third negative acknowledgement (NACK) indication indicating that at least one of the second plurality of blocks was not received correctly, the NACK indication not indicating which of the second plurality of blocks was not received correctly.

Paragraph 17. A method according to any of paragraphs 9 to 16, the method comprising: in response to receiving the first negative acknowledgement (NACK) indication, transmitting second control information to the receiver, the second control information comprising one or more of an indication of which of the first plurality of blocks are within the subset of the first plurality of blocks and an indication of the second communications resources.

Paragraph 18. A data receiving device, the data receiving device comprising a receiver configured to receive a first plurality of blocks transmitted by a data transmitting device using first communications resources of a wireless access interface, a transmitter configured to transmit signals representing acknowledgement indications, and a controller, configured to control the transmitter and the receiver so that the data receiving device is operable: to determine that at least one of the first plurality of blocks was not received correctly, in response to determining that at least one of the first plurality of blocks was not received correctly, to transmit to the data transmitting device a first negative acknowledgement (NACK) indication indicating that at least one of the first plurality of blocks was not received correctly, the NACK indication not indicating which of the first plurality of blocks was not received correctly, to receive a subset of the first plurality of blocks retransmitted by the data transmitting device in response to the NACK indication using second communications resources, and after receiving the subset of the first plurality of blocks, to determine whether all of the first plurality of blocks have been received correctly.

Paragraph 19. A communications device for use in a wireless communications network, the communications device comprising a data receiving device according to paragraph 18, the wireless communications network comprising an infrastructure equipment providing the wireless access interface, the infrastructure equipment comprising the data transmitting device.

Paragraph 20. Circuitry for a data receiving device, the circuitry comprising receiver circuitry configured to receive a first plurality of blocks transmitted by a data transmitting device using first communications resources of a wireless access interface, transmitter circuitry configured to transmit signals representing acknowledgement indications, and controller circuitry, configured to control the transmitter circuitry and the receiver circuitry so that the data receiving device is operable: to determine that at least one of the first plurality of blocks was not received correctly, in response to determining that at least one of the first plurality of blocks was not received correctly, to transmit to the data transmitting device a first negative acknowledgement (NACK) indication indicating that at least one of the first plurality of blocks was not received correctly, the NACK indication not indicating which of the first plurality of blocks was not received correctly, to receive a subset of the first plurality of blocks retransmitted by the data transmitting device in response to the NACK indication using second communications resources, and after receiving the subset of the first plurality of blocks, to determine whether all of the first plurality of blocks have been received correctly.

Paragraph 21. A data transmitting device, the data receiving device comprising a transmitter configured to transmit a first plurality of blocks to a data receiving device using first communications resources of a wireless access interface, a receiver configured to receive acknowledgement indications, a controller, configured to control the transmitter and the receiver so that the data transmitting device is operable: to receive from the data receiving device a first negative acknowledgement (NACK) indication indicating that at least one of the first plurality of blocks was not received correctly, the NACK indication not indicating which of the first plurality of blocks was not received correctly, and in response to receiving the NACK indication, to retransmit a subset of the first plurality of blocks to the data receiving device using second communications resources.

Paragraph 22. Infrastructure equipment for use in a wireless communications network, the infrastructure equipment comprising a data transmitting device according to paragraph 21 and providing the wireless access interface.

Paragraph 23. Circuitry for a data transmitting device, the data receiving device comprising transmitter circuitry configured to transmit a first plurality of blocks to a data receiving device using first communications resources of a wireless access interface, receiver circuitry configured to receive acknowledgement indications, controller circuitry, configured to control the transmitter circuitry and the receiver circuitry so that the data transmitting device is operable: to receive from the data receiving device a first negative acknowledgement (NACK) indication indicating that at least one of the first plurality of blocks was not received correctly, the NACK indication not indicating which of the first plurality of blocks was not received correctly, and in response to receiving the NACK indication, to retransmit a subset of the first plurality of blocks to the data receiving device using second communications resources.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2 (Release 15)", June 2018
[2] Holma H. and Toskala A, "LTE for UMTS OFDMA and SC-FDMA based radio access", John Wiley and Sons, 2009
[3] TR 38.913, "Study on Scenarios and Requirements for Next Generation Access Technologies (Release 14)".
[4] 3GPP document RP-170732, "New WID on Even further enhanced MTC for LTE," Ericsson, Qualcomm, RAN #75
[5] 3GPP document RP-170852, "New WID on Further NB-IoT enhancements," Huawei, HiSilicon, Neul, RAN #75
[6] 3GPP document RP-181450, "New WID on Rel-16 MTC enhancements for LTE," Ericsson, RAN #80
[7] 3GPP document RP-181451, "New WID on Rel-16 enhancements for NB-IoT," Ericsson, Huawei, RAN #80

What is claimed is:

1. A method for a receiver, the method comprising:
   receiving a first plurality of blocks transmitted by a transmitter using first communications resources,
   determining that at least one of the first plurality of blocks was not received correctly,
   in response to determining that at least one of the first plurality of blocks was not received correctly, transmitting to the transmitter a first negative acknowledgement (NACK) indication indicating that at least one of the first plurality of blocks was not received correctly, the NACK indication not indicating which of the first plurality of blocks was not received correctly,
   receiving a subset of the first plurality of blocks retransmitted by the transmitter in response to the NACK indication using second communications resources, and
   after receiving the subset of the first plurality of blocks, determining whether all of the first plurality of blocks have been received correctly.

2. A method according to claim 1, the method comprising:
   in response to determining whether all of the first plurality of blocks have been received correctly after receiving the subset of the first plurality of blocks,
   if all of the first plurality of blocks have been received correctly, transmitting a positive acknowledgement (ACK) indication to the transmitter, the ACK indication indicating that all of the first plurality of blocks have been received correctly, and
   if not all of the first plurality of blocks have been received correctly, transmitting a second NACK indication to the transmitter which does not indicate which of the first plurality of blocks have not been received correctly.

3. A method according to claim 1, wherein determining that at least one of the first plurality of blocks was not received correctly comprises determining which of the first plurality of blocks was not received correctly, and the method comprises:
   for each block which was not received correctly, transmitting a corresponding block-specific negative acknowledgement indication, the block-specific negative acknowledgement indication indicating that the corresponding block of the first plurality of blocks was not received correctly.

4. A method according to claim 3, the method comprising:
   for each block which was received correctly, transmitting a corresponding block-specific positive acknowledgement indication, the block-specific positive acknowledgement indication indicating that the corresponding block of the first plurality of blocks was received correctly.

5. A method according to claim 1, wherein each block in the first plurality of blocks comprises error detection bits for detecting, by the receiver, whether the block after decoding by the receiver contains one or more errors, and
   the determining that the at least one of the first plurality of blocks was not received correctly comprises determining based on the error detection bits of the decoded block that the at least one of the decoded blocks contains one or more errors.

6. A method according to claim 1, the method comprising:
   before receiving the first plurality of blocks, receiving control information indicating the first communications resources.

7. A method according to claim 6, wherein the control information indicates third communications resources, the method comprising:
   receiving a second plurality of blocks transmitted by the transmitter using the third communications resources,
   determining that at least one of the second plurality of blocks was not received correctly,
   in response to determining that at least one of the second plurality of blocks was not received correctly, transmitting to the transmitter a third negative acknowledgement (NACK) indication indicating that at least one of the second plurality of blocks was not received correctly, the third NACK indication not indicating which of the second plurality of blocks was not received correctly.

8. A method according to claim 1, the method comprising:
   receiving second control information transmitted by the transmitter in response to the NACK indication, the second control information comprising one or more of an indication of which of the first plurality of blocks are within the subset of the first plurality of blocks and an indication of the second communications resources.

9. A method for a transmitter, the method comprising:
   transmitting a first plurality of blocks to a receiver using first communications resources,
   receiving from the receiver a first negative acknowledgement (NACK) indication indicating that at least one of the first plurality of blocks was not received correctly, the NACK indication not indicating which of the first plurality of blocks was not received correctly, and
   in response to receiving the NACK indication, retransmitting a subset of the first plurality of blocks to the receiver using second communications resources.

10. A method according to claim 9, the method comprising
    after retransmitting the subset of the first plurality of blocks to the receiver using the second communications resources, receiving a second NACK indication from the receiver which does not indicate which of the first plurality of blocks have not been received correctly.

11. A method according to claim 9, the method comprising:
    after retransmitting the subset of the first plurality of blocks to the receiver using the second communications resources, receiving a positive acknowledgement (ACK) indication to the transmitter, the ACK indication indicating that all of the first plurality of blocks have been received correctly.

12. A method according to claim 9, the method comprising
for each block which was not received correctly by the receiver, receiving a corresponding block-specific negative acknowledgement indication.

13. A method according to claim 9, the method comprising:
for each block which was received correctly by the receiver, receiving a corresponding block-specific positive acknowledgement indication.

14. A method according to claim 9, wherein each block in the first plurality of blocks comprises error detection bits for detecting, by the receiver, whether the block after decoding by the receiver contains one or more errors.

15. A method according to claim 9, the method comprising:
transmitting control information, the control information indicating the first communications resources.

16. A method according to claim 15, wherein the control information indicates third communications resources, the method comprising
transmitting a second plurality of blocks to the receiver using the third communications resources, and
receiving from the receiver a third negative acknowledgement (NACK) indication indicating that at least one of the second plurality of blocks was not received correctly, the NACK indication not indicating which of the second plurality of blocks was not received correctly.

17. A method according to claim 9, the method comprising:
in response to receiving the first negative acknowledgement (NACK) indication, transmitting second control information to the receiver, the second control information comprising one or more of an indication of which of the first plurality of blocks are within the subset of the first plurality of blocks and an indication of the second communications resources.

18. A data receiving device, the data receiving device comprising
a receiver configured to receive a first plurality of blocks transmitted by a data transmitting device using first communications resources of a wireless access interface,
a transmitter configured to transmit signals representing acknowledgement indications, and
a controller, configured to control the transmitter and the receiver so that the data receiving device is operable:
to determine that at least one of the first plurality of blocks was not received correctly,
in response to determining that at least one of the first plurality of blocks was not received correctly, to transmit to the data transmitting device a first negative acknowledgement (NACK) indication indicating that at least one of the first plurality of blocks was not received correctly, the NACK indication not indicating which of the first plurality of blocks was not received correctly,
to receive a subset of the first plurality of blocks retransmitted by the data transmitting device in response to the NACK indication using second communications resources, and
after receiving the subset of the first plurality of blocks, to determine whether all of the first plurality of blocks have been received correctly.

\* \* \* \* \*